Figure 1:
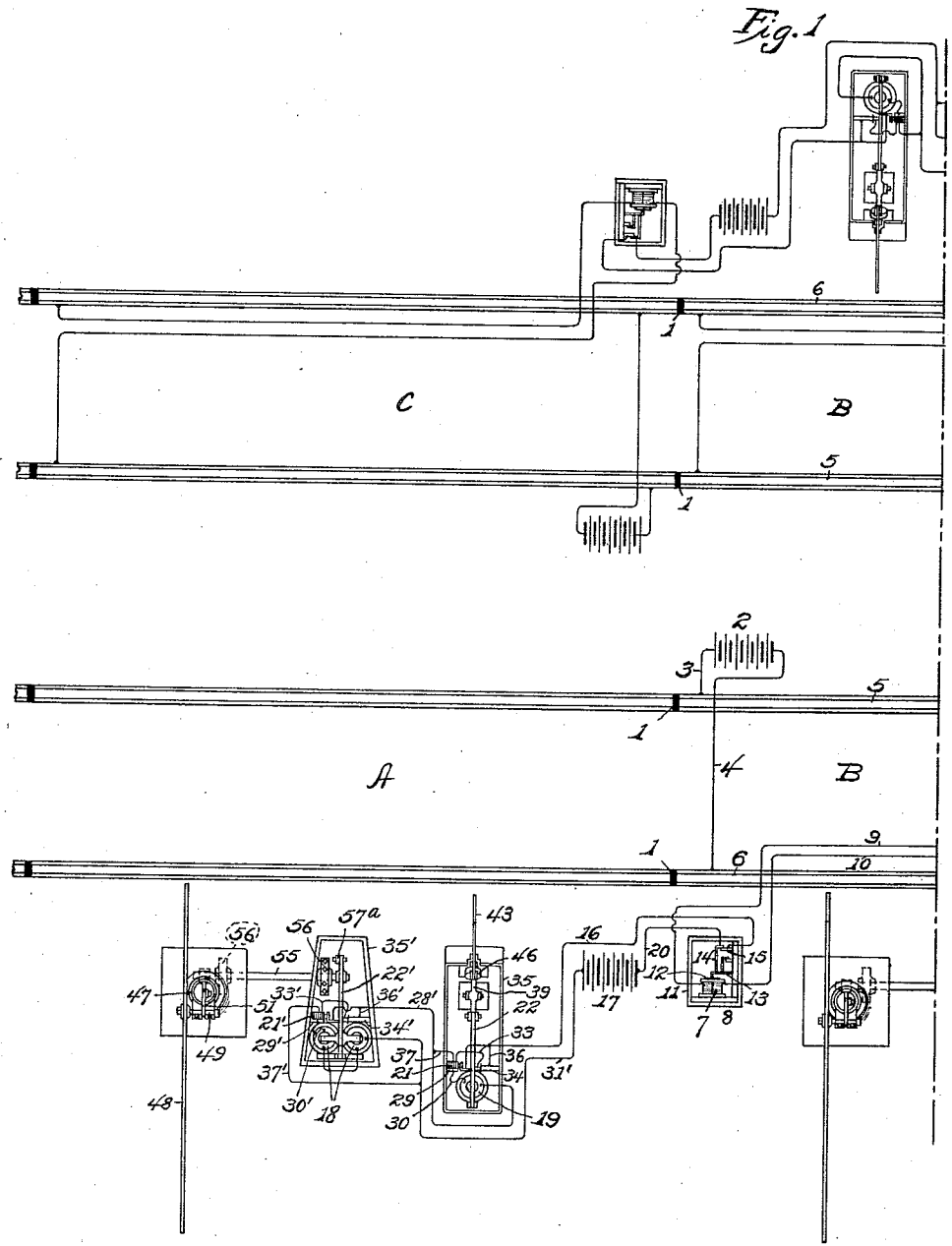

F. A. PIERCE.
TRAIN CONTROL AND SIGNAL SYSTEM FOR DOUBLE TRACK RAILWAYS.
APPLICATION FILED APR. 21, 1909.

1,082,095.

Patented Dec. 23, 1913.

5 SHEETS—SHEET 1.

WITNESSES:

INVENTOR
Franklin A. Pierce
BY
ATTORNEY

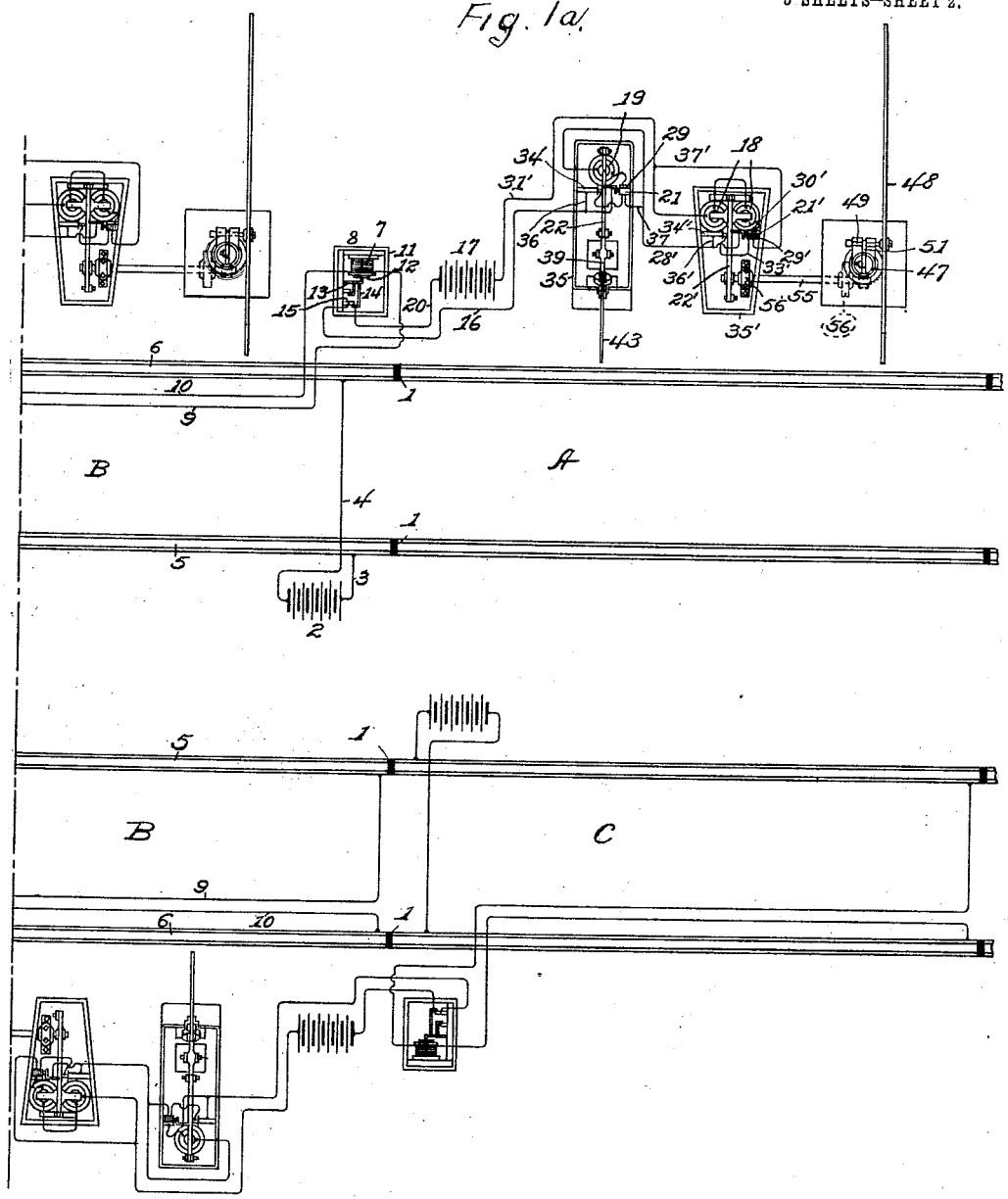

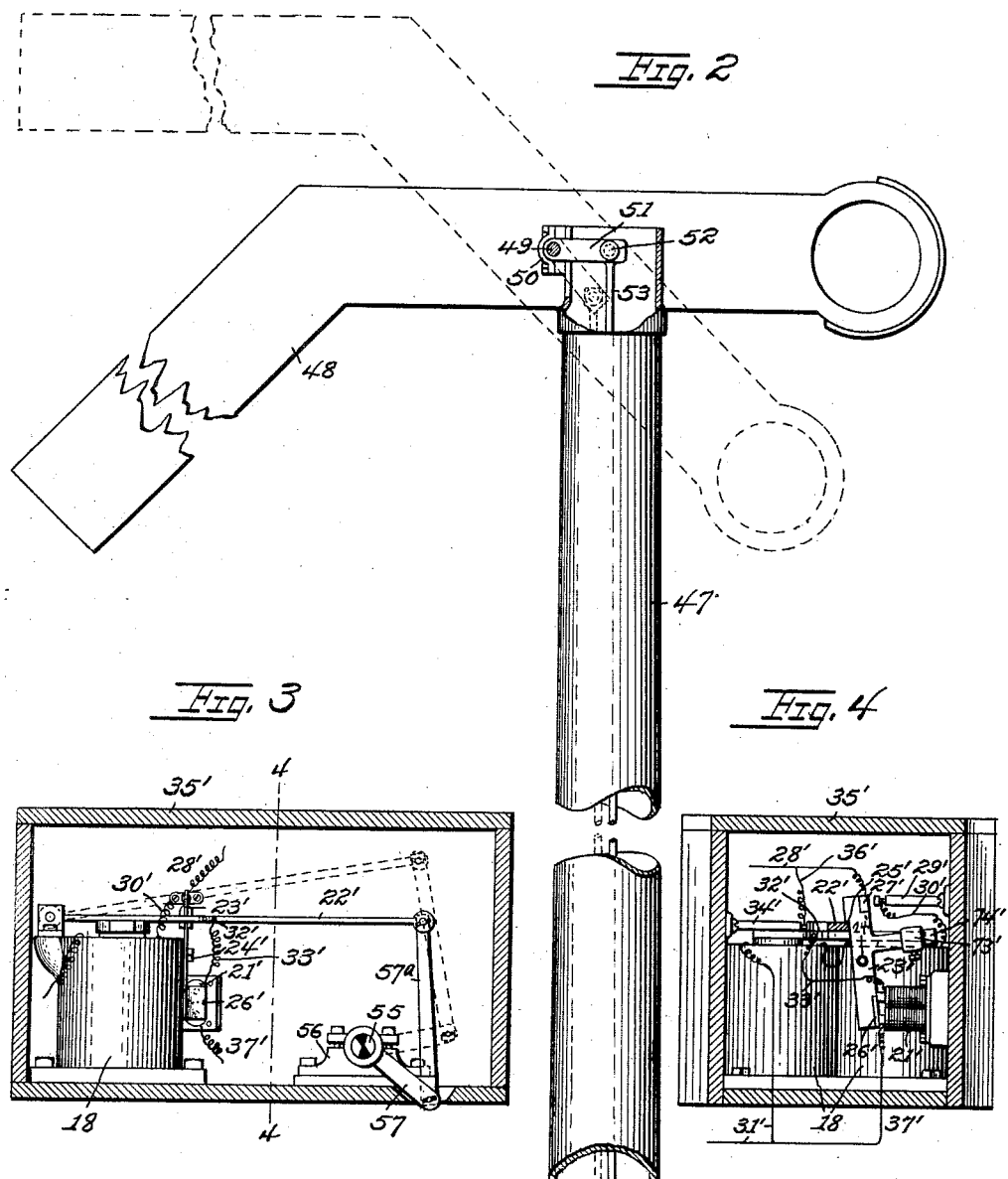

F. A. PIERCE.
TRAIN CONTROL AND SIGNAL SYSTEM FOR DOUBLE TRACK RAILWAYS.
APPLICATION FILED APR. 21, 1909.
1,082,095.
Patented Dec. 23, 1913.
5 SHEETS—SHEET 4.
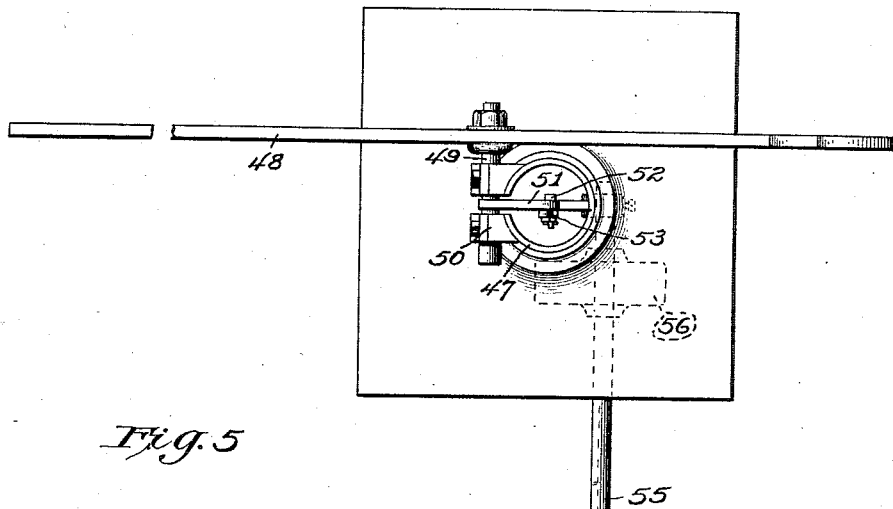
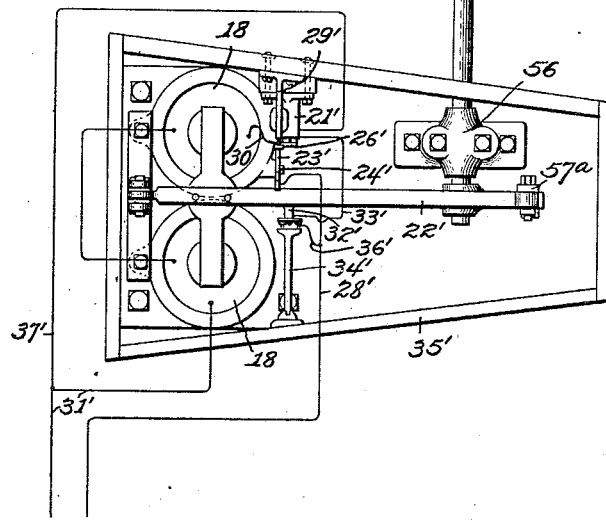

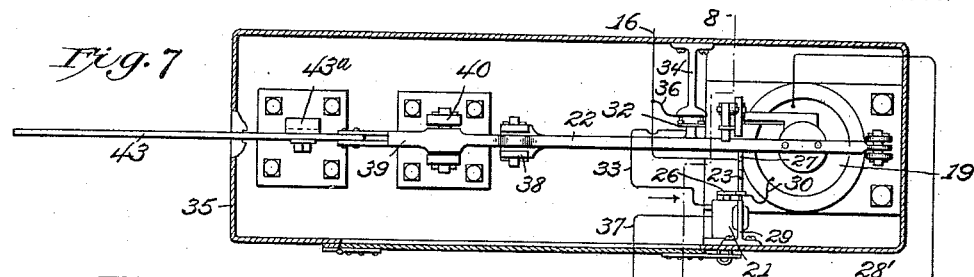

UNITED STATES PATENT OFFICE.

FRANKLIN A. PIERCE, OF WHEELING, WEST VIRGINIA.

TRAIN CONTROL AND SIGNAL SYSTEM FOR DOUBLE-TRACK RAILWAYS.

1,082,095. Specification of Letters Patent. Patented Dec. 23, 1913.

Application filed April 21, 1909. Serial No. 491,254.

*To all whom it may concern:*

Be it known that I, FRANKLIN A. PIERCE, a citizen of the United States of America, and resident of Wheeling, county of Ohio, and State of West Virginia, have invented certain new and useful Improvements in Train Control and Signal Systems for Double-Track Railways, of which the following is a specification.

This invention pertains to a protective system for double-track railways.

The primary object of this invention is to provide a protective system for double-track railways, which consists of a system of electric circuits arranged in blocks in each track of the railway and having associated therewith certain mechanisms for automatically effecting the application of the brakes of the air-brake system of a train, said mechanisms being controlled or actuated by any condition within a block which effects a disturbance of the track-circuit which includes said block.

A further object of the invention is to provide an electrically-controlled tripping device which is adapted to coöperate with train-line venting means carried by a train whereby the brakes of the latter are automatically applied, stopping the train, when it approaches a block already occupied or wherein other disturbances arise or exist which effect the breaking of the electric track-circuit or the short-circuiting of the current in said circuit.

A still further object of the invention is to provide, in connection with said system of electric circuits, a block-signal system which is automatically operated and controlled through said circuits by the same conditions which effect the operation of the tripping devices hereinbefore mentioned. And a still further object is to provide a system of the character mentioned wherein the restoration of normal conditions within a block restores the interrupted circuits and the mechanism controlled thereby to normal condition and position, respectively, indicating that the disturbance within the block has ceased to exist, and admitting of the uninterrupted and unobstructed passage of a train to said block.

By means of the system involved in this invention, each train controls the block or section of track in which it travels, and also a predetermined length of track contiguous to said block or section at the rear end thereof, thus rendering it impossible for a train approaching the block occupied by another train to enter the occupied block, or to approach within a predetermined distance thereof. Further, each train automatically operates the block-signal, or semaphore, located at a point in the rear of the block occupied thereby in such manner as to indicate the presence of the train in said block. In other words, through the signal-system each train indicates to the crew of a train approaching the block which it occupies that said block is so occupied; and, when such signal is passed unheeded, through the tripping devices, effects the automatic stoppage of the approaching train before said block can be entered.

Another object of the invention is to provide a system whereby any disturbance, such as a broken rail, open switch, or other analogous condition within a block, effects the operation of said block-signal and tripping device in the same manner as if the block were occupied by a train.

In carrying out the invention, each track of the double-track system is divided into a series of blocks, and each block has its track-rails insulated from those of adjoining blocks. The track-rails of each block are included in an electric circuit, hereinafter termed the track-circuit, the latter also including a battery, or other source of electrical energy, located at, or adjacent to, one terminus of the block, wires leading from the opposite poles of said battery to the track-rails at said terminus, wires leading from said track-rails at the opposite terminus of the block, and an electro-magnet which forms a part of a circuit-closer.

A second electric circuit, hereinafter termed the train-control circuit, includes contact-points in said circuit-closer, and a tripping device, the latter being adapted to coöperate with a valve carried by the engine of a train for venting the train-line of the train's air-brake system when said train unheedingly approaches a block occupied by another train, said tripping device being spaced from the rear end of the block a sufficient distance to effect the stoppage of a train running at a high rate of speed before it can enter said block. Also included in said train-control circuit and located adjacent to the rear terminus of the block is a semaphore operating mechanism which directly controls the operation of a semaphore, or block signal, stationed at a point adjacent to and in the rear of the location of said tripping device. Since, in a double-track system, all trains on each track travel in the same direction, the rear end only of each block need be guarded by the tripping mechanism and semaphore mentioned.

When a train enters a block, the current in the track-circuit, which is normally closed, crosses over through the axle of the engine, short circuiting the battery which controls said block, and consequently de-energizes the magnet which forms a part of the circuit closer for said block, allowing the contact-points of said circuit-closer to separate, breaking the train-control circuit to the tripping device for said block and to the semaphore which indicates the condition of said block, causing the latter to drop to a position indicating the presence of a train or other circuit-disturbing element or influence within the block, and, at the same time, causing the tripping device to assume a position for operating the train-line venting-valve carried by each train.

In the drawings—Figures 1 and 1ª, are diagrammatic views showing the invention applied to a double-track; Fig. 2 is a side elevation of the semaphore mechanism showing the base and top portions partly broken away and in section; Fig. 3 is a sectional view of the casing containing the semaphore operating mechanism showing the operating parts in side elevation; Fig. 4 is a section on line 4—4, Fig. 3; Fig. 5 is a top plan view of the semaphore and operating parts thereof; Fig. 6 is a longitudinal sectional view of the casing containing the tripping mechanism showing the operating parts in side elevation; Fig. 7 is a horizontal sectional view of Fig. 6; Fig. 8 is a cross section on line 8—8 of Fig. 7 showing the armature locked in operative position; Fig. 9 is a similar view showing the armature locked in inoperative position; Fig. 10 is a detail perspective view of the armature employed in connection with the restraining means; Fig. 11 is a top plan view of the circuit closer showing the casing cover removed; and Fig. 12 is an enlarged section on line 12—12, Fig. 11.

The present invention is directed to the trip mechanism and trip system as distinguished from my application filed April 17, 1909, Serial No. 490,518, which though disclosing the same trip mechanism, is directed to the circuit closer structure, and is also distinguished from my application filed April 17, 1909, Serial No. 490,519, which though disclosing the trip mechanism is directed to the semaphore signal mechanism.

In said drawing, A, B and C indicate a series of adjoining blocks into which one of the tracks is divided, the track-rails of said blocks being insulated from each other, as shown at 1. Controlling the track-circuit for the block B is a battery 2, the opposite poles of which are connected by wires 3 and 4 with the opposite track-rails 5 and 6 at a point adjacent to one end or terminus of the block. Leading from said rails at the opposite terminus of the block to an electro-magnet 7, which forms a part of a circuit-closer 8, are wires 9 and 10. Said circuit closer is inclosed within a casing 11 of non-conductive material. The armature 12 of said magnet 7 is pivotally attached to the free end of a spring-copper bracket 13 which is rigidly attached at its opposite end to the casing 11, and mounted on said bracket is a contact-plate 14, the point of which overlies a second contact-plate 15 rigidly mounted on the casing 11, as shown.

As long as the track-circuit to the magnet 7 remains undisturbed, the armature 12 is held in engagement with said magnet, and, consequently, the contact-plates 14 and 15 are held in engagement; but, when said track-circuit is disturbed, as by a broken rail or the short-circuiting of the battery 2, due to the entrance of a train into the block, the magnet 7 is deënergized and the contact-plates 14 and 15 are permitted to separate.

Connected to the contact-plate 15 is a wire 16 located in the train-control circuit hereinbefore referred to, said train-control including a battery 17, a pair of magnet coils 18 which form a part of a semaphore operating mechanism located outside and adjacent to the rear terminus of the block B, a magnet 19 forming a part of a tripping device which is located adjacent to and in front of said semaphore-operating mechanism, a wire 20 leading from said battery 17 to the contact-plate 14, and a return wire 31 leading from said magnet 18 to the battery 17. As is obvious, the track-circuit is normally closed, and, so long as it remains closed, the train-control circuit is also closed. Also included in said train-control circuit is a small electro-magnet 21' which controls a locking mechanism whereby the armature 22' of said magnet 18 is normally maintained in engagement with the latter. Said magnet 18 is intended to move or operate the parts composing the semaphore which it controls, which parts are so arranged that when the armature is depressed, or is in engagement with the magnet, the semaphore blade stands at "safety." For preventing the consumption of current which would otherwise be required to maintain the magnet active for normally holding said armature 22' in normal position, a locking-bar 23' is provided for said armature, said locking-bar being controlled by the small magnet 21' hereinbefore referred to. Said locking-bar 23' is pivoted at 24' upon the side of the magnet 18 and has a hook-end 25' adapted to interlock with the armature 22'. Said locking-bar has an armature 26' upon its lower end which is adapted to be attracted by the small magnet 21' for causing said bar to assume a locking position with reference to the armature 22'.

Leading to a contact-plate 27' on the rear face of the upper end of the locking bar 23' is a wire 28'. Said locking bar is normally maintained by a weight 73' carried on an arm 74' in a non-locking position with the contact-plate 27' in contact with a contact-post 29' which is connected by a wire 30' to the large magnet 18. When the armature 26' is attracted by the small magnet 21', the locking-bar is swung into interlocking engagement with the armature 22' against the resistance of the weight 73'. As is obvious, when the train-control circuit is completed by the contacting of the plates 14 and 15, the current travels through all the connections just described, energizing the large magnet 18 and attracting the armature 22'. When said armature is drawn down into engagement with said magnet 18, a contact-plate 32', carried by one edge of said armature 22' and connected by a wire 33' to the small magnet 21', contacts with a contact-post 34' mounted on the inner side of a box 35' which incloses the semaphore-operating mechanism, said post 34' being connected by a wire 36' to said wire 28'. A wire 37' leading from the small magnet 21' to the wire 31' as shown, completes the circuit through the small magnet 21', which immediately draws the armature 26' on the locking bar thereagainst, effecting the movement of said bar to a position in interlocking engagement with the armature 22'. Such movement of said bar breaks the contact between the points 27' and consequently breaks the circuit through the large magnet 18, deënergizing the latter, which remains deënergized as long as the track-circuit is undisturbed, holding the control-plates 14 and 15 in contact. At the same time that the armature 22' is drawn downward, the semaphore blade is moved, through intermediate mechanism from danger to safety position, which latter position is maintained as long as the track-circuit remains undisturbed.

The semaphore and the operating mechanism therefor comprises a tubular pole 47 having a blade 48 of usual form mounted thereon, said blade being fixed upon a shaft 49 journaled in a boxing 50 at the top of said pole. A crank-arm 51 fixed to said shaft 49 has a wrist-pin 52 to which is pivotally attached the upper end of a rod 53 which is vertically movable within said pole. The lower end of said rod 53 is pivotally connected to a crank-arm 54 fixed upon a shaft 55 which is journaled in appropriate bearings 56 and has fixed thereto or thereon a second crank-arm 57 which is pivotally connected to the lower end of an upright link 57ª the latter being pivotally connected to the free end of the hinged armature 22' hereinbefore described. The said wire 28' leads to the contact-plate 27' from the large magnet 19 of the tripping device, the electrical portion and wiring of which is similar to that just described in connection with the semaphore-operating mechanism, having a large magnet 19 similar to magnet 18, a hinged armature 22, a small magnet 21, contact posts 29 and 34, a locking-bar 23 having an armature 26 adapted to be attracted by said small magnet 21, a contact-plate 27 carried by said locking-bar, to which said wire 16 directly leads, said contact-plate being adapted to contact with a post 29, connected by a wire 30 to said magnet 19, from which latter leads the said wire 28'. A contact-plate 32 carried by one edge of the armature 22 and connected by a wire 33 to the small magnet 21 contacts with a contact-post 34 of the inclosing box 35, said post 34 being connected by wire 36 to the wire 16. A wire 37 leads from the small magnet 21 to the wire 28', as shown, and thus when the armature 22 is lowered, the circuit through the small magnet 21 is completed. The closing of this circuit immediately effects the drawing of the armature 26 of the locking-bar 23 against said magnet 21 against the resistance of the weight 73, swinging said locking-bar into interlocking engagement with the lowered armature 22. This movement breaks the contact between the points 27 and 29 and consequently breaks the circuit through the large magnet 19, deënergizing the latter, which remains deënergized as long as the track-circuit is undisturbed.

The point or free end of the armature 22 is pivotally connected to one end of a brass link 38, the opposite end of which is pivotally connected to the rear end of a lever 39 which is pivotally mounted intermediate its ends upon a stand 40 whose opposite end is pivotally attached to the lower end of a substantialy upright link 41. The upper end of the last mentioned link is pivoted to one end of a link 42 whose opposite end is rigidly attached to a pivotally-supported trip-arm 43 which projects outward from the box 35 as shown, and which is carried by the top end of a post 43ª. Said trip-arm is normally maintained in a downwardly-inclined position so as to be out of range of the operating lever 44 of the train-line venting-valve 45 carried by each train, the retaining means consisting of the locking mechanism hereinbefore described. When, on the other hand, the circuit through the small magnet 21 is broken, as by the entrance of a train upon the block in which it is located, said locking mechanism is released, and the armature 22 and the links and levers just described are actuated by a counterpoise weight 46 to assume the positions shown in dotted lines in Fig. 6, raising the trip-arm 43 to a substantially horizontal position, in which position it will be struck by the operating lever 44 of a passing train.

It will be noted that the semaphore operating mechanism and the tripping device act together, or in unison, the semaphore blade being normally held at safety position and the trip-arm being normally held in inoperative position with relation to the operating levers of the train-line venting-valves of trains; and, when the track-circuit is disturbed, as by the entrance of a train to the block, the semaphore blade immediately assumes a danger position and the trip-arm assumes operative position.

The large magnets 18 and 19, either or both of which may be single or double, the former being shown double and the latter single in the drawings, are energized only the length of time required to move their armatures into engagement therewith, resulting in the consumption of a relatively small amount of electric current. The track-circuit consists of the battery 2, wire 3, rail 5, wire 9, magnet 7, wire 10, rail 6 and wire 4. The circuit through the large magnets 18 and 19 passes from battery 17 through wire 31 to the magnet 18 in the signal mechanism, thence through wire 30′, post 29′, contact-point 27′, wire 28′, magnet 19, wire 30, contact-post 29, contact plate 27, wire 16, contact plate 15, contact plate 14, and thence through wire 20 back to the battery 17. When the circuit is broken through the large magnets, as it normally is, the current passes from the battery 17 through wires 31 and 37′ to small magnet 21′, thence to wire 33′, contact plate 32′, post 34′, wire 36′, wire 28′, wire 37, magnet 21, wire 33, contact plate 32, post 34, wire 36, wire 16, contact plate 15, contact plate 14, and thence through wire 20 back to the battery 17.

When the track-circuit in a block is broken or disturbed by such danger conditions as, for instance, a broken rail, an open switch, an open drawbridge, or analogous condition, or when the battery 2 is short circuited by the entrance of a train into the block, the magnet 7 is deënergized, releasing the armature 12 and allowing the contact plates 14 and 15 to separate. This separation of said contacts results in the opening of the train-control circuit, releasing the armatures 26 and 26′ of the locking bars 23 and 23′, respectively, and allowing the latter to be moved by the weights 73 and 73′, from interlocking engagement with the armatures 22 and 22′, resulting in the semaphore blade 48 being moved to danger position and in the trip-arm 43 being moved to operative position.

In Figs. 7, 8 and 9 is shown a locking means whereby the armature 22 of the tripping device is retained in operative position and securely locked against movement while in such position. This locking mechanism consists of a vertical post 100, which is rigidly supported at one side of magnet 19 so as to project above the top face thereof, there being a short branch arm 101 carried by said post which extends outwardly and to which is pivoted, as at 102, a right angular arm 103, the base member 104 of which constitutes an armature adapted to engage the upwardly projecting core of the magnet. To the upper end of arm 103 is pivoted a latch member 105 which has sliding movement through a keeper 106 carried by the upper end of post 100. When magnet 19 is energized, the armature 104 of the arm 103 is attracted thereby and the arm is moved from the position shown in Fig. 9 to that shown in Fig. 8, at which time the latch member 105, having been withdrawn from underlying engagement with armature 22, the latter is freed and rendered susceptible to the influence exerted by the energizing of magnet 19 and is thus moved to the position shown in Fig. 8. As is manifest from inspection of Fig. 9, the weight constituted by armature 104 holds the arm 103 in substantially upright position with the latch member 105 in underlying engagement with armature 22 so that the latter is prevented from having downward movement.

What is claimed is:—

In a protective system for railways, a track divided into blocks, a normally closed track circuit including a magnet for each block, a train control circuit controlled by said magnet, main energizable means included in said train control circuit, air brake valve operating means connected to said main energizable means so as to be moved thereby from operative to inoperative position, auxiliary energizable means, controlled by said magnet means actuated by said auxiliary means when energized for locking said valve operating means in inoperative position, said locking means opening the train control circuit when moved to locking position, said magnet being adapted to be deënergized when a train enters the block, means released by the magnet when deënergized for effecting the opening of the train control circuit, the last mentioned means being actuated, when the train leaves the block and said track circuit is reëstablished, to reëstablish the train control circuit through said main energizable means, and means controlled by the reëstablishment of the circuit through said main energizable means for energizing said auxiliary energizable means, whereby said locking means of the valve operating means is operated and the circuit through the main energizable means is simultaneously broken.

In testimony whereof I affix my signature in presence of two subscribing witnesses.

FRANKLIN A. PIERCE.

Witnesses:
H. E. DUNLAP,
J. W. SPEIDEL.

---

Copies of this patent may be obtained for five cents each, by addressing the "Commissioner of Patents, Washington, D. C."